Patented June 15, 1954

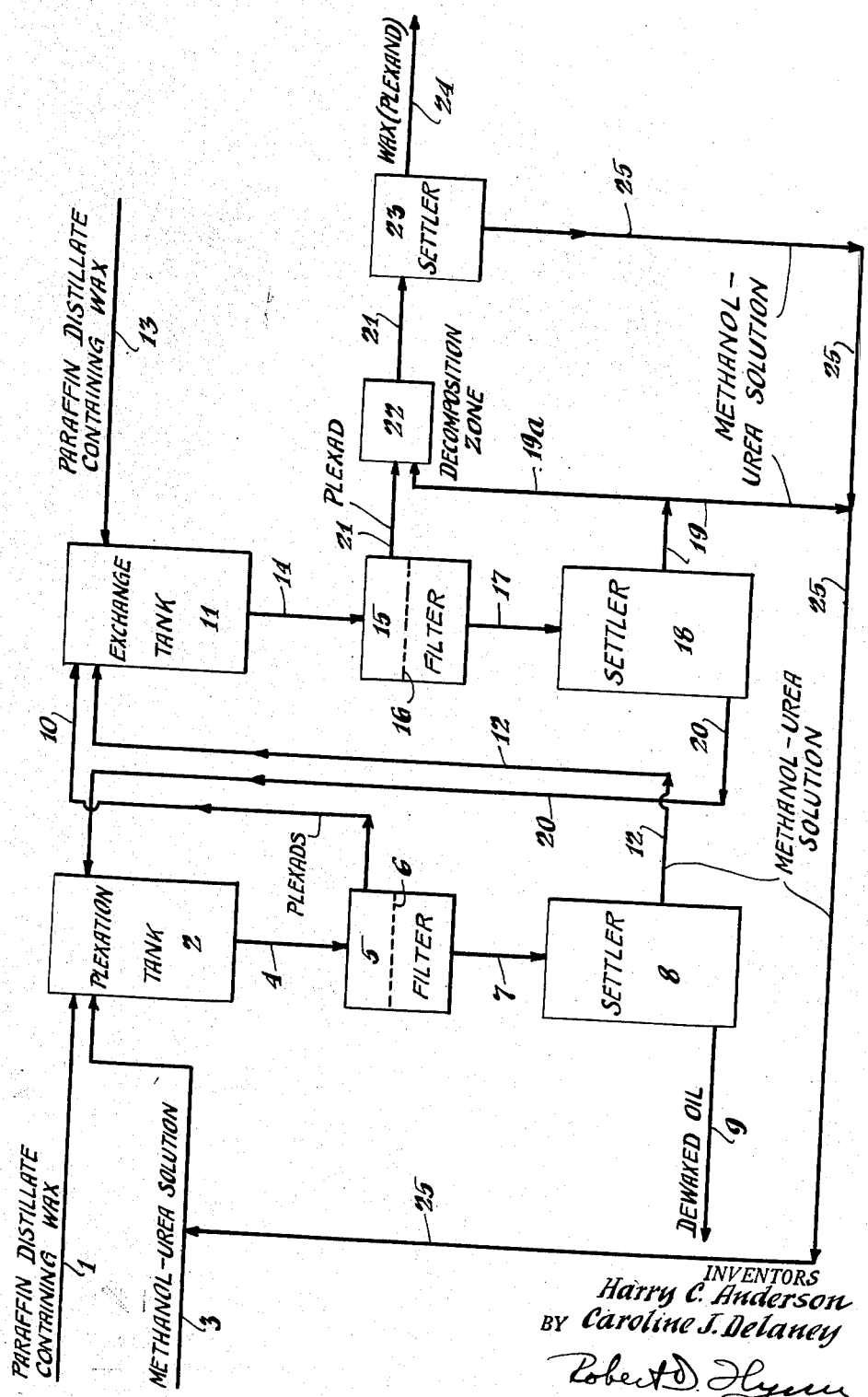

2,681,303

UNITED STATES PATENT OFFICE 2,681,303

SEPARATION OF HYDROCARBONS AND HYDROCARBON DERIVATIVES BY ADDUCT FORMATION

Harry C. Anderson, Baltimore, Md., and Caroline J. Delaney, Mickleton, N. J., assignors to Socony-Vacuum Oil Company, Incorporated, a corporation of New York Application September 20, 1949, Serial No. 116,784

9 Claims. (Cl. 196—19)

This invention has to do with the separation of hydrocarbons and hydrocarbon derivatives of different molecular configuration from mixtures containing the same.

I. FIELD OF INVENTION

Numerous processes have been developed for the separation of hydrocarbons and hydrocarbon derivatives of different molecular configuration by taking advantage of their selective solubility in selected reagents or solvents from which they may later be separated. Exemplary of hydrocarbon separation procedures is the Edeleanu process, wherein paraffinic materials are separated from aromatics by virtue of the greater solubility of aromatics in liquid sulfur dioxide. Lubricant oil solvent refining processes, solvent deasphalting, solvent dewaxing and the like are further examples of the separation of hydrocarbons of different molecular configuration. Typical of selective solvent procedures for separating hydrocarbon derivatives is the separation of paraffin wax, monochlorwax and polychlorwaxes, with acetone as the selective solvent.

This invention is concerned with the general field outlined above, but based upon a different and little-known phenomenon, namely, the differing ability of hydrocarbons and hydrocarbon derivatives to enter into and to be removed from certain crystalline complexes. As used herein, the term "complex" broadly denotes a combination of two or more compounds.

This invention is predicated upon the knowledge that urea and thiourea form complex crystalline compounds to a varying degree with various forms of hydrocarbons and hydrocarbon derivatives.

II. PRIOR ART

For some years it has been known that various isomers of aromatic hydrocarbon derivatives form complexes with urea. Kremann (Monatshefte f. Chemie 28, 1125 (1907)) observed that complexes, designated as "double compounds," of urea and the isomeric cresols are stable at different temperatures. Schotte and Priewe (1,830,859) later separated meta-cresol from the corresponding para isomer by selectively forming a meta-cresol-urea complex, which was described as an "addition compound"; the latter compound was separated from the para isomer and then split up by distillation or with water or acid to obtain pure meta-cresol. The "addition compound" of meta-cresol and urea was shown thereafter to have utility as a disinfectant (Priewe, 1,933,757). Bentley and Catlow (1,980,901) found a number of aromatic amines containing at least one basic amino group capable of forming "double compounds" with certain isomeric phenols. It has also been shown that trans-oestradiol can be separated from the corresponding cis-compound by forming a difficultly soluble compound of urea and trans-oestradiol (Priewe, 2,300,134).

The forces between urea and the compounds of the foregoing complexes are due to specific chemical interaction between the various functional groups.

One heterocyclic compound, 2:6 lutidine, has been found to form a crystalline compound with urea, thus affording a means of separating the lutidine from beta- and gamma-picolines (Riethof, 2,295,606).

Comparatively few aliphatic hydrocarbon derivatives have been known to date to form complex compounds with urea. In German patent application B190,197, IV d/12 (Technical Oil Mission, Reel 143; Library of Congress, May 22, 1946), Bengen described a method for the separation of aliphatic oxygen-containing compounds (acids, alcohols, aldehydes, esters and ketones) and of straight chain hydrocarbons of at least six carbon atoms from mixtures containing the same, the method being predicated upon the ability of such compounds and hydrocarbons to form "Additions—Produkt," with urea. A mixture containing such aliphatic compounds is contacted with a concentrated solution of urea in water, methanol, or ethanol, and the like. In the Technical Oil Mission translation of the Bengen application, however, the urea complexes were designated "adducts," which term apparently stems from the anglicized "addition product." The "adducts" are separated into their components, urea and straight chain hydrocarbon or aliphatic oxygen-containing compound, by heating or by the addition of methanol, water or an aqueous solution.

Thiourea has also been known to form complexes, perhaps the first of which is a complex with ethyl oxalate (Nencki, Berichte 7, 780 (1874)). Recently, crystalline molecular complexes of thiourea and certain organic compounds were described by Angla (Compt. rendus 224, 402–4 and 1166 (1947)). The organic compounds recited include cyclic hydrocarbons such as cyclohexane, cyclohexene, polycyclic terpenes; halides, alcohols and ketones of such cyclic hydrocarbons; and halides of short chain paraffins. Crystalline molecular complexes of such compounds are dissociated by water and organic solvents to their components, thiourea and a compound of the foregoing type.

III. DEFINITIONS

From the foregoing discussion of prior art (II), it will be clear that a variety of terms have been applied to urea and thiourea complexes. The latter have been rather loosely described as "double compounds," "addition compounds," "difficultly soluble compounds," "Additions—Produkt," "adducts," and "crystalline molecular complexes." All of these terms are somewhat ambiguous in that they have also been used to describe products or complexes of different character than the urea complexes under consideration. This is particularly so with the term "adduct," and the related terms "unadducted material" and "non-adducted material." While the term "adduct" is simple and convenient, it is an unfortunate designation, inasmuch as it confuses these complexes with other substances known in the chemical art. Specifically, "adduct" has been applied to Diels-Alder reaction products, formed by reaction of conjugated diolefins and olefins and their derivatives. As is well known, Diels-Alder products, as a rule do not revert to their original constituents when heated or treated with water, acids, solvents, etc. Moreover, the term "adduct" has been defined earlier as "The product of a reaction between molecules, which occurs in such a way that the original molecules or their residues have their long axes parallel to one another." (Concise Chemical and Technical Dictionary.) Further ambiguity is introduced by the term "adduction," which has been defined as "oxidation." (Hackh.)

To avoid the foregoing conflicting terminology, several related terms have been coined to define with greater specificity the substances involved in the phenomenon under consideration. As contemplated herein and as used throughout the specification and appended claims, the following terms identify the phenomenon:

Plexad—a revertable associated complex comprising a plexor, such as urea, and at least one other compound; said plexad characterized by reverting or decomposing, under the influence of heat and/or various solvents, to its original constituents, namely, a plexor and at least one plexand.

Plexand—a compound capable of forming a plexad with a plexor, such as urea and thiourea; compounds of this character differ in their capacity to form plexads, depending upon various factors described hereinafter, compounds having a relatively greater capacity for plexation being identified as primary plexands, and others being identified as secondary plexands.

Antiplex—a compound incapable of forming a plexad with a plexor.

Plexor—a compound capable of forming a plexad with a plexand; such as urea and thiourea.

Plexate—to form a plexad.

Plexation—the act, process or effect of plexating.

IV. OUTLINE OF INVENTION

It has now been found that the separation procedures used hitherto can be improved materially to provide a primary plexand substantially free of a secondary plexand. More specifically, it has been found that a primary plexand separated, in the form of a plexad, from a mixture of the same and a secondary plexand by plexation and associated with a lesser quantity of the secondary plexand than in the original mixture, can be further concentrated by treating the plexads with a quantity of depleted plexor solution in the presence of a quantity of the same primary plexand or a different primary plexand having a greater capacity to form a plexad than the secondary plexand. In this manner, the secondary plexand is displaced by or exchanged with the primary plexand.

As indicated above, urea and thiourea plexads have been formed by contacting a mixture containing plexands and one or more antiplexes, with urea or thiourea carried in a suitable solvent, whereupon urea or thiourea plexads were formed. The plexads were then separated from the antiplex by decantation, filtration or similar means, and the plexads were decomposed into their components by heating or by contact with a suitable solvent. Plexation procedures of the foregoing character, however, are relatively inefficient when one or more plexands are present, inasmuch as an appreciable quantity of the weaker or secondary plexand is plexated and remains in admixture with the stronger or primary plexand when the plexads are decomposed. This is particularly pronounced in the treatment of lubricating oil stocks, and of slackwaxes and the like, from which waxes are removed by plexation urea.

By way of illustration, the refining of wax obtained by decomposition of urea-wax plexads produced by procedures such as mentioned above, has been somewhat difficult and costly because of the high oil content, despite exhaustive washing of the urea plexads with naphthas, iso-octane, pentane or other oil solvents to remove occluded or associated oil. However, examination of the oil removed from the wax by solvent refining methods reveals that the oil is itself capable of undergoing plexation, and in this sense may be considered as a secondary plexand having a lesser capacity to form a plexad than the wax, primary plexand. Further evidence of the ability of the oil to form a urea plexad is given by its high viscosity index, characteristic of predominantly straight-chain hydrocarbons. In short, then, the oil is not merely mechanically bound or occluded in the urea plexad, but is, in part at least, actually plexated and therefore cannot be readily removed by washing with suitable solvents. By the process contemplated hereinabove, however, the oil is effectively removed by contacting the urea plexads with a source of unplexated wax, such as a waxy paraffin distillate, in the presence of a depleted urea solution, whereupon the higher molecular weight wax displaces or exchanges with the lower molecular weight plexated oil. This can be effected in one exchange, or in a series of such exchanges, to reduce the oil content of the wax to a desirable value. In effect, the oil content can be reduced such that conventional sweating of the wax is unnecessary, with a refined wax being produced directly by a series of such exchanges.

V. OBJECTS

It is an object of this invention, therefore, to provide an effective means for separating hydrocarbons and hydrocarbon derivatives of different molecular configuration from mixtures containing the same.

It is also an object of this invention to separate a primary plexand from a secondary plexand, and to provide a primary plexand substantially free of a secondary plexand. A corresponding object is to separate a secondary plexand from a primary plexand, and the provision of a secondary plexand substantially free of a primary plexand.

A more particular object is to separate a primary hydrocarbon plexand from other hydrocarbons, including antiplexes and secondary plexands. An important object is to separate a hydrocarbon wax from a mixture of the same and hydrocarbon oils, and to provide a substantially oil-free hydrocarbon wax.

Another important object is the provision of a continuous method of separation of said primary plexands and secondary plexands, which method is flexible, capable of relatively sharp separation, and not highly demanding of attention and of utilities such as heat, refrigeration, pumping power and the like.

Other objects and advantages of the invention will be apparent from the following description.

VI. INVENTION IN DETAIL

As indicated above, it has been found that the foregoing objects are achieved by plexation with urea or thiourea of a mixture containing a primary plexand and a secondary plexand, thereby forming a mixture of plexads, and treating the plexads in the presence of a depleted plexor solution with the same primary plexand or another primary plexand.

(1) PLEXANDS AND MIXTURES SUITABLE FOR PLEXATION

The hydrocarbon mixtures and oxygen-containing paraffin mixtures mentioned in the discussion of the prior art, above, are contemplated herein. So also are the compounds, plexands, shown therein to have the capacity to form plexads. For example, when urea is used as a plexor, the mixture used may be: isomeric cresols (Kremann; Schotte and Priewe); oestradiols (Priewe); lutidine-picolines (Riethof); hydrocarbons containing straight chain hydrocarbons of at least six carbon atoms per molecule, and oxygen-containing mixtures containing straight chain acids, alcohols, aldehydes, esters and/or ketones having at least six carbon atoms per molecule (Bengen). It will be apparent from the definitions recited above, that the plexands of these mixtures are the compounds forming plexads with urea, and that the antiplexes are the compounds which do not form urea plexads.

Hydrocarbon mixtures containing n-paraffins in the range of $C_7$–$C_{30}$ and higher, such as wax distillates, foots-oil, gas oils, virgin kerosenes, straight run naphthas are also suitable when urea is used as the plexor, such mixture being shown in copending application Serial Number 4,997, filed January 29, 1948. Other mixtures shown in the latter application and also suitable here are: hydrocarbon mixtures containing n-paraffins and n-olefins, and prepared by synthesis with carbon monoxide and hydrogen, i. e., typical Fischer-Tropsch products prepared using cobalt and iron catalysts; cracked mixtures prepared by the vapor phase cracking of stocks rich in n-paraffins, such as by the cracking of paraffinic gas oils, foots-oil, crude waxes, etc.; mixtures containing straight chain oxygenated compounds, such as acids, alcohols, aldehydes and esters, and containing branched compounds, such as those obtained by synthesis from hydrogen and carbon monoxide over an iron catalyst or by oxidation of high molecular weight hydrocarbons; mixtures consisting essentially of n-paraffins and n-olefins, for the n-paraffins form stronger plexads than the n-olefins; mixtures consisting essentially of n-olefins with the double bond in various positions, for the olefins having the double bond near the end of the chain form stronger plexads than those having the double bond further from the end of the chain; hydrocarbon mixtures obtained by isomerization, alkylation dehydrocyclization, dehydrogenation, etc.

Other mixtures which may be more effectively plexated with urea by the present process are those containing hydrocarbon derivatives and shown in application Serial No. 115,511, filed September 13, 1949, now abandoned in favor of application Serial Number 374,707, filed August 17, 1953. Typical of the mixtures described in the latter application are mixtures containing a straight chain halide having the halogen atom attached to a terminal carbon and having at least about five carbons in the chain. Mixtures containing compounds characterized by a nitrogen-containing substituent, are also advantageously plexated with the present process; such mixtures include amines, amides, nitriles, nitroparaffins, etc. and are described in application Serial No. 115,515, filed September 13, 1949. Sulfur-containing compounds present in various mixtures are also plexated efficiently herein; these are shown in application Serial No. 115,516, filed September 13, 1949, now abandoned. Compounds containing cyclic substituents, present in various mixtures, are also efficiently plexated with urea in the present process, being shown in application Serial No. 116,593, filed September 13, 1949. Plexation with urea of various terminally substituted compounds from mixtures containing the same and non-terminally substituted compounds, described in application Serial No. 115,517, filed September 13, 1949, is also aided materially by the present process.

Urea plexation of a non-terminally monosubstituted compound from mixtures containing the same and a non-terminally poly-substituted compound, described in application Serial No. 115,513, filed September 13, 1949, now U. S. Patent Number 2,642,422, is also improved substantially by the present process. Similarly, more effective resolution with urea of mixtures containing paraffinic compounds of different degrees of unsaturation is realized herein; these mixtures are described in detail in applications Serial Nos. 115,514 and 115,518, filed September 13, 1949, the latter now 2,642,423.

With regard to thiourea plexation, the mixtures shown in applications Serial Nos. 115,512 and 115,730, filed September 13 and 14, 1949 respectively, both abandoned, are suitable in the present process. In application Serial No. 115,512, highly branched paraffins and/or highly branched olefins are separated from straight chain or less highly branched compounds. In application Serial No. 115,730, certain cycloparaffins and/or cyclo-olefins are separated from mixtures of the same and other hydrocarbons.

As shown in said copending application Serial No. 115,511, now abandoned, plexation of a compound, plexand, dissolved in a branched chain hydrocarbon solvent (antiplex) with a saturated urea solution proceeds until the concentration of the plexand is reduced to a certain minimum concentration which may be termed the "equilibrium concentration." In general, the "equilibrium concentration" is lower, the lower the temperature of plexation and is dependent only upon the temperature and not upon the solvent for the plexand, provided the urea solution is maintained saturated with urea and provided the plexand-solvent phase can be regarded as an ideal solution. Also, it has been noted that the "equilibrium concentration" decreases with the increasing molecular weight of the plexands.

Equilibrium values have been determined for a number of compounds by agitating solutions of varying concentrations of various compounds in iso-actane with a 70% methanol-30% water solution and noting the minimum concentration required for plexad formation. The results are summarized in Table I below. These results show that all plexands do not form plexads equally well, i. e., some plexands, secondary in character, form plexads less readily. For example, it will be noted that caproic acid forms a plexad more readily than does capryl alcohol, which, in turn, has a greater capacity for plexad formation than either the corresponding chloride or bromide.

Table I
EQUILIBRIUM VALUES

| Structure | "Equilibrium Conc.," Volume Percent | Temp., ° C. |
|---|---|---|
| Terminal Substituent: | | |
| $H_3C(CH_2)_6COOH$ | 4.0 | 25 |
| $H_3C(CH_2)_6CH_2OH$ | 6.0±1 | 27 |
| $H_3C(CH_2)_6CH_2Cl$ | 13.7 | 25 |
| $H_3C(CH_2)_6CH_2Br$ | 19.4±1 | 31 |
| $H_3C(CH_2)_6CH_3$ | 26.0 | 25 |
| Non-Terminal Substituent: | | |
| $H_3CCH_2CH(CH_3)_3CH_3$ | No Plexad | 25 |
| $H_3CCH(CH_2)_5CH_3$ with COOH | 43.0±1.5 | 27 |
| $H_3CCH_2CH(CH_2)_3CH_3$ with OH | No Plexad | 25 |
| $H_3CCH(CH_2)_5CH_3$ with $CH_2OH$ | ---do--- | 25 |
| $H_3CCH(CH_2)_5CH_3$ with Cl | ---do--- | 30 |
| Br | | |

In a similar vein, plexation of a plexand with a saturated thiourea solution proceeds until the concentration of the plexand is reduced to a certain minimum concentration, i. e., "equilibrium concentration." This is described in the aforementioned copending application Serial No. 115,512, which was abandoned together with said application Serial No. 115,730, in favor of said application Serial No. 320,012 (now 2,642,378). When a plexand in an antiplex solvent is contacted with a slurry of thiourea in a saturated thiourea solution, the plexand is plexated to such an extent that its concentration is reduced to its equilibrium value for the given temperature, provided sufficiently long contact times, of the order of 0.5–3 hours, are employed and sufficient excess thiourea is initially present such that the thiourea solvent remains substantially saturated with thiourea after plexation is complete. "Equilibrium concentrations" for several representative paraffins and olefins were determined at 25° C., using a thiourea-saturated 70 per cent methanol solution. Normal decane-hydrocarbon solutions of various concentrations of the hydrocarbon being investigated were stirred with thiourea solution until the minimum concentration at which plexation would take place was defined within ±2.5 per cent. The results are shown in Table II, below.

Table II
EQUILIBRIUM VALUES IN THE THIOUREA PLEXATION OF PARAFFINS AND OLEFINS

| Hydrocarbon | Temp., ° C. | "Equilibrium Conc." in Volume Percent |
|---|---|---|
| Isopentane | 25.0 | 62.5±2.5 |
| 2,3-Dimethyl Butane | 25.5 | 29.8±1.2 |
| Do | 25.5 | 10.7±0.8 |
| 2,2,3-Trimethyl Butane | 25.5 | 11.1±0.5 |
| Do | 25.5 | 83.8±1.3 |
| 2,2,4-Trimethyl Pentane | 25.5 | 43.8±1.3 |
| Diisobutylene | 25.0 | 32.5±2.5 |

The completeness with which a particular hydrocarbon may be removed by thiourea plexation may be increased by lowering the temperature. The "equilibrium concentration" in an antiplex solvent generally decreases by a factor of about two (2) in lowering the temperature from 25° C. to 0° C., and by another factor of about 2.3 in lowering the temperature from 0 to −25° C. This relationship is shown by the following. "Equilibrium concentrations" for plexad formation of 2,2,3-trimethyl butane and diisobutylene, respectively. were determined at 0° C. for comparison with the values at 25° C. The results are given below in Table III.

(2) PLEXOR

The plexors used herein include urea and thiourea, each of which is used in solution in a suitable solvent. This solution should range from partially saturated to supersaturated at the temperature at which it is contacted with the mixture of plexands, or mixture of plexands and one or more antiplexes. In some cases, it will be found convenient to suspend a further supply of urea or thiourea crystals in the solution, handling it as a slurry. The solvent, physically, should have at least a slight solvent power for the hydrocarbons, etc., under treatment. For gravity or centrifugal operations, it is convenient to use a solvent of such a specific gravity that after the formation of a desired amount of plexad, the specific gravity of the solvent phase will be different from that of the plexad phase and of the antiplex phase to a degree sufficient to permit separation by gravity, centrifuging, etc. Preferably in such operations, the urea or thiourea solvent should have a density less than that of water.

Table III

| Hydrocarbon | "Equilibrium Conc." (A) in Vol. Percent at 0° C. | "Equilibrium Conc." (B) in Vol. Percent at 25° C. | B/A | A/B |
|---|---|---|---|---|
| 2,2,3-Trimethyl Butane | 5.9±1.1 | 11.1±0.5 (25.5° C.) | ≅1.9 | ≅0.53 |
| Diisobutylene | 17.5±0.8 | 32.5±2.5 | ≅1.9 | ≅0.54 |

The solvent should be substantially inert to the compounds of the mixture and also to the urea and thiourea. Preferably, it should also be heat stable, both alone and in contact with urea or thiourea, at temperatures at which the desired plexad is not heat stable.

As indicated above, the solvent may be either single- or multiple-component. It is sometimes convenient, particularly where the plexad is separated by gravity, to utilize a two-component system, as a ketone and an alcohol, glycol, amine or diamine, and preferably a lower aliphatic alcohol such as methanol or ethanol, or an aliphatic amine such as piperidine. Such a solvent, partially to completely saturated with urea or thiourea, lends itself readily to a continuous process for separation by plexation.

In certain cases the use of single-component solvents is advantageous. Single-component solvents other than alcohols may be employed, although they are normally not as useful as the lower aliphatic alcohols. Glycols may be employed as single solvents, yet ethylene glycol is generally not suitable in gravity separations due to the high density of the urea or thiourea saturated solvent. The higher glycols and particularly the butylene glycols may be advantageously employed. Diamines such as diamine-ethane, -propane and -butane may likewise be employed. Additional useful solvents include formic acid, acetic acid, formamide and acetonitrile, although the first three of these are subject to the same limitations as ethylene glycol.

Other particularly advantageous solvents contemplated herein are the ketones described in copending application Serial No. 115,388, filed September 13, 1949, now abandoned and p-cresol described in copending application Serial No. 115,444, filed September 13, 1949, now U. S. Patent No. 2,642,379.

It is also contemplated herein to include a small quantity of a surface active agent in the urea or thiourea solution, in the manner described in copending application Serial No. 115,437, filed September 13, 1949.

Another modification contemplated herein is the procedure described in copending application Serial No. 137,739, filed January 10, 1950, now abandoned, involving contact of hydrocarbons and/or hydrocarbon derivatives with a plexor impregnated upon a porous support.

The use of water, or of aqueous plexor solutions, is to be avoided in the "exchange" process described herein since initial plexation and also secondary plexation or "exchange" occurs quite slowly in aqueous media. For efficient operation, the solvent should be such that plexation and "exchange" are substantially complete in a relatively short time. In addition, the greater the volume of plexor solution used, the less agglomerated are the plexad crystals, and, therefore, the more readily the "exchange" will occur inasmuch as plexation and "exchange" appear to take place in the plexor solvent phase. If the amount of plexor available for plexation is increased, the amount of material plexated is increased so that, for optimum operation, relatively dilute plexor solutions are preferred in the initial plexation and are necessary in the "exchange" or secondary plexation. This condition is fulfilled by using all or a portion of the used or depleted plexor solution from the initial plexation in the "exchange" operation.

In the "exchange" operation, the plexor solution used is deficient in plexor to cause further plexation. In other words, the depleted or deficient plexor solution from the initial plexation acts as the medium in which the "exchange" is effected, with added primary plexand displacing or exchanging with the secondary plexand. In this "exchange" no additional plexad is formed since the concentration of plexor in the depleted solution is insufficient to form a plexad. In general, the depleted plexor solutions used in the "exchange" operation range from about 40 per cent to about 50 per cent of saturation.

The quantity of primary plexand used in the "exchange" operation, of necessity, will vary considerably. This quantity will depend upon the amount of secondary plexand which is in the form of a plexad and which is to be displaced.

An understanding of a preferred embodiment of this invention may be facilitated by reference to the accompanying illustrative drawing, Figure 1, which is a schematic flow-diagram of one specific arrangement for practicing the invention.

In Figure 1, a mixture of hydrocarbons such as a paraffin distillate containing wax is introduced through line 1 to plexation tank 2. A suitable methanol-urea solution such as one containing 15 to 20 per cent by weight urea, is introduced to plexation tank 2 through line 3. The mixture of hydrocarbons and methanol-urea solution in tank 2 is agitated for a suitable period of time, from a few minutes to about 3 hours, and at a suitable temperature, for example 100° F., in order to realize a satisfactory degree of plexation. The resulting mixture containing plexads of urea and wax, and of urea and long straight chain hydrocarbons, and containing occluded oil, is taken from tank 2 through line 4 to filter 5. The plexads are solid and collect on filter plate 6, and the remainder of the mixture from tank 2 is taken as a filtrate through line 7 to settler 8. In settler 8, methanol-urea solution forms the upper layer and dewaxed oil, or dewaxed paraffin distillate, forms the lower layer and is withdrawn through line 9 for use or for further processing, such as water-washing and topping to a neutral stock.

The urea plexads collected in filter 5 on plate 6 are taken through line 10 to an exchange tank, 11, wherein they contact methanol-urea solution taken from settler 8 through line 12. The methanol-urea solution in line 12 is, of course, of lower concentration than that originally introduced in line 3, as a consequence of the plexad formation in tank 2. Fresh paraffin distillate containing wax is also introduced, through line 13, to exchange tank 11 and is agitated with the plexads and methanol-urea solution under conditions of time and temperature such as used in tank 2, or with a higher operating temperature, preferably not above 140° F. The quantity of fresh paraffin distillate introduced through line 13 is so maintained that there is a deficiency of urea in tank 11, that is, insufficient to plexate the long straight chain oils as well as the wax. In this way, the oils are freed from their corresponding urea plexads.

The resulting mixture in tank 11 is taken through line 14 to filter 15, wherein the urea-wax plexads are collected on filter plate 16. The filtrate from filter 15 comprises methanol-urea solution and paraffin distillate, and flows through line 17 to settler 18. Methanol-urea solution forms the upper layer in settler 18 and is taken in part through line 19 for recycle to line 3, and in part through line 19a to decomposition zone 22. Paraffin distillate of lower wax content than that introduced to the system through line 13, forms the lower layer in settler 18 and is recycled through line 20 to tank 2.

Urea-wax plexads in filter 15 are taken through line 21 and decomposition zone 22, maintained at a temperature sufficiently high to decompose or resolve the plexads, such as about 140° F. The heated mixture in line 21 is then introduced to settler 23, wherein wax forms the upper layer and urea in methanol-urea solution forms the lower layer. Wax is removed from settler 23 through line 24, and methanol-urea solution is recycled through line 25 to line 3.

It is to be understood that instead of using fresh paraffin distillate in tank 11, it is also advantageous to use a wax, carried in a suitable solvent such as a branched chain hydrocarbon or a short chain paraffin. The wax then displaces the long chain oils from their corresponding urea plexads. Other convenient sources of wax can also be used in the exchange, such for example a foots oil.

As a further modification, a multi-stage procedure resembling a counter-current extraction in solvent refining can be employed. To effect the exchange of a stronger plexand for a weaker plexand, oil from one stage is passed forward through a series of stages, while both solid plexad and urea solution are passed through the series in the opposite direction.

ILLUSTRATIVE EXAMPLES

EXAMPLE I n-Decane (95% purity) and a 20 per cent methanol-urea solution, were agitated for about 10 minutes at 25° C. A plexad was formed of urea and n-decane. The plexad was filtered and the solid plexad was washed twice with n-pentane and dried. A portion of the dried plexand was decomposed on contact with a relatively large quantity of water. The hydrocarbon recovered from the decomposed plexad was separated and dried. Upon analysis the recovered hydrocarbon had a refractive index ($N_D^{20}$) of 1.4108, which is the accepted value for n-decane.

A second portion, 10 parts by weight, of the n-decane-urea plexad was agitated with a large excess of n-octadecane, 100 parts by weight, and 20 parts by volume of methanol containing urea (10 parts by weight) at a concentration insufficient to plexate n-octadecane. [This solution of urea in methanol was obtained by contacting a saturated solution of urea in methanol with excess n-octadecane and separating therefrom all solid plexad.] After stirring the urea-n-decane plexad, n-octadecane and methanol-urea solution for three hours at 25° C., the resulting plexad was filtered, washed and dried as described above. The plexad so obtained was decomposed with water, as indicated above, and the hydrocarbon (plexand) recovered therefrom was dried; an analysis, the hydrocarbon had a refractive index ($N_D^{29}$) of 1.4331.

Inasmuch as n-decane had a refractive index of 1.4108 and n-octadecane has a refractive index ($N_D^{32}$) of 1.4344, it is evident that the recovered hydrocarbon is predominantly n-octadecane. Further evidence is provided in the observation that the recovered hydrocarbon was solid at a temperature of about 20° C. Thus, it is clear that a longer straight chain paraffin will preferentially form a urea plexad than will a straight chain paraffin of fewer carbon atoms.

EXAMPLE II

One hundred parts, by volume, of a paraffin distillate of the following properties, were agitated at about 20-25° C. for twenty minutes with 300 parts, by volume, of methanol saturated with urea:

Gravity, °A. P. I. ____ 28.7
Pour point, °F. ____ 60
Wax (wt. per cent) __ 8.5 (by solvent dewaxing)

The plexads formed were recovered by filtration. One-half of the plexads was then decomposed to urea and hydrocarbons with exhaustive washing with n-pentane at 20-25° C.

One-half of the plexads was agitated for four hours at 20-25° C., with 100 parts, by voume, of fresh paraffin distillate and with 15 parts by volume of depleted urea solution from the initial plexation. The resulting plexads were recovered by filtration, washed, dried and decomposed in the same manner as the first plexads. Analyses of the waxes recovered from the initial plexads and from the second plexads showed the following:

Per cent oil
Wax from initial plexads _____ 11.3
Wax from second plexads _____ 3.4

The procedure used for determining oil content is that described at page 972 of the October 1948 issue of the Journal of Analytical Chemistry.

EXAMPLE III

One hundred and fifty parts, by volume, of a paraffin distillate identified in Example II, were agitated for one hour at 20-25° C. with 450 parts, by volume, of a saturated urea solution (95% methanol, 5% t-butanol, solvent). The plexads thus formed were recovered by filtration. One-third of the plexads was washed exhaustively with n-pentane, dried and decomposed, as described in Example I above. The remainder of the plexads was returned to the same agitator together with the methanol-urea solution recovered from the initial plexation and 150 parts by volume of fresh paraffin distillate. The latter materials were agitated for four hours at 20-25° C. and then allowed to settle for 16 hours. The resulting plexads were recovered by filtration, and one-half thereof was washed, dried and decomposed in the manner described above.

The remainder of the second plexads was wax exchanged again in the manner used in the second plexation, using the methanol-urea solution recovered from the second plexation and using 150 parts by volume of fresh paraffin distillate. The third plexads were recovered by filtration, washed, dried and decomposed, in the manner described above.

The oil content of each of the three waxes recovered from their corresponding urea plexads are given below:

Per cent oil
Wax before exchange (initial plexation) _____ 6.1
Wax after one exchange (second plexation)__ 5.5
Wax after two exchanges (third plexation)__ 2.6

We claim:
1. The separation of a compound (I) having the capacity to form a crystalline complex with a complex-forming agent selected from the group consisting of urea and thiourea, from a mixture containing said compound (I) and a compound (II) having a lesser capacity to form a crystalline complex with the same said agent, which comprises: contacting said mixture with a solution containing said agent, under conditions appropriate for the formation of crystalline complexes of said agent and said compounds (I) and (II); separating said crystalline complexes and depleted solution of said agent; contacting said crystalline complexes with a quantity of said compound (I) and with a quantity of said depleted solution containing said agent in an amount sufficient to cause further complex formation, whereupon said compound (I) displaces said compound (II) of the crystalline complexes; and separating a crystalline complex of said agent and said compound (I), from the mixture formed in the last-mentioned operation.

2. The separation of a compound (I) having the capacity to form a crystalline complex with a complex-forming agent selected from the group consisting of urea and thiourea, from a mixture containing said compound (I) and a compound (II) having a lesser capacity to form a crystalline complex with the same said agent, which comprises: contacting said mixture with a solution containing said agent, under conditions appropriate for the formation of crystalline complexes of said agent and said compounds (I) and (II); separating said crystalline complexes and depleted solution of said agent; contacting said crystalline complexes with a quantity of said compound (I) and with a quantity of said depleted solution containing said agent in an amount insufficient to cause further complex formation, whereupon said compound (I) displaces said compound (II) of the crystalline complexes; and separating a crystalline complex of said agent and said compound (I), from the mixture formed in the last-mentioned operation; decomposing the crystalline complex of said agent and said compound (I) to set free said compound (I) and said agent; and separating from said agent, said compound (I) substantially less contaminated with said compound (II) than said original mixture.

3. The separation defined by claim 1, wherein the agent is urea.

4. The separation defined by claim 1, wherein the agent is thiourea.

5. The separation of a compound (I) having the capacity to form a crystalline complex with a complex-forming agent selected from the group consisting of urea and thiourea, from a mixture containing said compound (I), a compound (II) having a lesser capacity to form a crystalline complex with the same said agent, and a compound (III) incapable of forming a crystalline complex with the same said agent, which comprises: contacting said mixture with a solution containing said agent, under conditions appropriate for the formation of crystalline complexes of said agent and said compounds (I) and (II); separating said crystalline complexes and depleted solution of said agent, from said compound (III); contacting said crystalline complexes with a quantity of said compound (I) and with a quantity of said depleted solution containing said agent in an amount insufficient to cause further complex formation, whereupon said compound (I) displaces said compound (II) of the crystalline complexes; and separating a crystalline complex of said agent and said compound (I), from the mixture formed in the last-mentioned operation.

6. The separation of a compound (I) having the capacity to form a crystalline complex with a complex-forming agent selected from the group consisting of urea and thiourea, from a mixture containing said compound (I), a compound (II) having a lesser capacity to form a crystalline complex with the same said agent, and a compound (III) incapable of forming a crystalline complex with the same said agent, which comprises: contacting said mixture with a solution containing said agent, under conditions appropriate for the formation of crystalline complexes of said agent and said compounds (I) and (II); separating said crystalline complexes and depleted solution of said agent, from said compound (III); contacting said crystalline complexes with a quantity of said compound (I) and with a quantity of said depleted solution containing said agent in an amount insufficient to cause further complex formation, whereupon said compound (I) displaces said compound (II) of the crystalline complexes; and separating a crystalline complex of said agent and said compound (I), from the mixture formed in the last-mentioned operation; decomposing the crystalline complex of said agent and said compound (I) to set free said compound (I) and said agent; and separating from said agent, said compound (I) substantially less contaminated with said compounds (II) and (III) than said original mixture.

7. The refining of a mixture of hydrocarbons containing wax and oil, which comprises: contacting said hydrocarbon mixture with a solution of a urea solvent containing urea, whereupon a mixture of urea-wax and urea-oil crystalline complexes is formed; separating said crystalline complexes and depleted urea solution; contacting said crystalline complexes with a quantity of said wax and with a quantity of said depleted urea solution containing urea in an amount insufficient to cause further complex formation, whereupon said wax displaces said oil of the urea-oil crystalline complex; separating a urea-wax crystalline complex from the mixture formed in the last-mentioned operation; decomposing the urea-wax complex to set free wax and urea; and separating from said freed urea, wax substantially less contaminated with oil than said hydrocarbon mixture.

8. The refining defined by claim 7, wherein the mixture is a mixture of substantially straight chain hydrocarbons containing wax and oil.

9. The refining of a paraffin distillate containing wax and oil, which comprises: contacting said distillate with a urea-methanol solution at about 25° C., whereupon a mixture of urea-wax and urea-oil crystalline complexes is formed; separating said crystalline complexes and depleted urea solution; contacting said complexes at about 25° C. with a quantity of fresh paraffin distillate and with the depleted urea solution, the latter containing urea in an amount insufficient to cause further complex formation, whereupon wax present in said fresh paraffin distillate displaces said oil of the urea-oil crystalline complexes; separating a urea-wax crystalline complex from the mixture formed in the last-mentioned operation; decomposing said urea-wax complex to set free said wax and urea; and separating from said freed urea, wax substantially less contaminated with oil than said paraffin distillate.

References Cited in the file of this patent
UNITED STATES PATENTS

| Number | Name | Date |
|---|---|---|
| 2,376,008 | Riethof | May 15, 1945 |
| 2,464,311 | Hiatt et al. | Mar. 15, 1949 |
| 2,470,339 | Clausson et al. | May 17, 1949 |
| 2,499,820 | Fetterly | Mar. 7, 1950 |
| 2,549,372 | Fetterly II | Apr. 17, 1951 |
| 2,588,602 | Adams et al. | Mar. 11, 1952 |